United States Patent [19]

Lowe et al.

[11] Patent Number: 4,986,451
[45] Date of Patent: * Jan. 22, 1991

[54] DISPENSING DEVICE FOR SOLUBLE OR DISPERSIBLE MATERIAL

[76] Inventors: Christopher H. Lowe, 21 Charleston Ct., Forrestfield, Furnace Green, Crawley, Sussex RH10 6PT, United Kingdom; Nicholas J. Allen, Flat 2, 23 Hampstead Lane, Highgate, London N.6, United Kingdom

[*] Notice: The portion of the term of this patent subsequent to Aug. 29, 2006 has been disclaimed.

[21] Appl. No.: 377,477

[22] Filed: Jul. 10, 1989

Related U.S. Application Data

[63] Continuation-in-part of Ser. No. 133,534, Dec. 16, 1987, Pat. No. 4,860,929.

[30] Foreign Application Priority Data

Dec. 16, 1986 [GB] United Kingdom ................ 8629966

[51] Int. Cl.$^5$ ........................ A47J 31/00; B65B 29/02
[52] U.S. Cl. .................................... 222/189; 99/295; 99/323; 206/0.5; 426/77; 426/85
[58] Field of Search ................ 222/129, 145, 189, 92, 222/192; 99/323, 295, 316; 206/0.5; 239/33; 426/77, 85

[56] References Cited

U.S. PATENT DOCUMENTS

| | | |
|---|---|---|
| 214,617 | 4/1879 | Brown . |
| 790,626 | 5/1905 | French . |
| 1,489,806 | 4/1924 | Anderson . |
| 2,859,515 | 3/1956 | Kinman . |
| 2,901,357 | 8/1959 | Epstein . |
| 3,102,465 | 9/1963 | Montesano . |
| 3,154,418 | 10/1964 | Lovell et al. ............... 206/0.5 X |
| 3,946,652 | 3/1976 | Gorin ........................... 99/323 |
| 4,338,338 | 7/1982 | Popkes ..................... 99/323 X |
| 4,465,697 | 8/1984 | Brice et al. ............... 206/0.5 X |
| 4,518,082 | 5/1985 | Ye . |
| 4,658,990 | 4/1987 | Ramage . |
| 4,860,929 | 8/1989 | Lowe et al. ................... 222/189 |

Primary Examiner—Andres Kashnkiow
Assistant Examiner—Gregory L. Huson
Attorney, Agent, or Firm—Poms, Smith, Lande & Rose

[57] ABSTRACT

A dispensing device for a soluble or dispersible material is disclosed, which device comprises a tube formed of a liquid-impermeable material and of unitary construction, the tube being closed at both ends and having perforations along a portion of its length at or close to one end, and containing a soluble granular material. Preferably the lower end of the tube has a flattened, paddle-like portion, and the perforations are arranged linearly along opposite sides of the tube aligned with the edges of the flattened portion. The tube is advantageously divided into two compartments by a temporary seal; in this way, the material can be kept in one compartment which is free from perforations until the device is to be used.

15 Claims, 3 Drawing Sheets

DISPENSING DEVICE FOR SOLUBLE OR DISPERSIBLE MATERIAL

RELATED APPLICATION

This application is a Continuation-in-part of application Ser. No. 133,5344 filed Dec. 16, 1987 now U.S. Pat. No. 4,860,929.

BACKGROUND OF THE INVENTION

This invention relates to a dispensing device for soluble or dispersible materials and, more particularly, relates to such a device in the form of an elongate tubular device of unitary construction sealed at both ends.

Telescopic tubular packaging/infusion units are known. For example, U.S. Pat. No. 3,102,465 discloses a packaging/infusion unit which comprises two parts, one being a sheath element permanently closed at one end and accommodating, via its other end, a foraminate charge-holding element. The latter may be completely retracted into the sheath element, and the device in this configuration may be sealed by a closure cap. Devices of this type are relatively complicated to fabricate and have not found acceptance in the market place. Although U.S. Pat. No. 3,102,465 issued on Sept. 3, 1963, there have not to our knowledge been any developments in the interim period which have enabled tubular packaging/infusion devices to gain market acceptance.

SUMMARY OF THE INVENTION

An object of the present invention is to provide a tubular dispensing device which is simpler to produce than the packaging/infusion unit disclosed in U.S. Pat. No. 3,102,465.

According to one aspect of the present invention, there is provided a dispensing device for soluble or dispersible materials, which device comprises a tube formed of a liquid-impermeable material and of unitary construction, the tube being closed at both ends when ready for use and having perforations along a portion of its length at or close to one end, and containing or adapted to receive a soluble or dispersible material.

The solvent for the soluble granular material will in practice often be water, but the invention is not limited to dispensing materials which are water-soluble.

It will be appreciated that, where the device contains a granular material in contact with perforations in the wall of the device, the grain size of the granular material and the size of the perforations are selected so that the granular material is prevented from spilling out via the perforations.

DESCRIPTION OF THE PREFERRED EMBODIMENTS

Preferably, a device in accordance with this invention resembles and/or is formed from a drinking straw (e.g. formed of a synthetic polymeric material such as polyethelene or polypropylene). In order to fabricate a device in accordance with this invention, such a straw may first be sealed at one end, e.g. by clamping the end of the tube between hot metal plates. Next the material which is to be dispersed by the device e.g. a granular material, is poured into the straw after which the open end is sealed, for example by clamping it between hot plates. Perforations are provided along a portion of the length of the straw, and these will usually be formed prior to the filling of the straw with for example granular material. The ease of fabrication of the device will thus be readily appreciated.

Preferably, the lower, sealed end of the tube has a flattened portion, and the perforations in the tube are located along the sides of the tube where an imaginary extension of the flattened end portion would intersect with the sides of the tube. There may in addition be further perforations adjacent to the flattened end portion. We have found that such an arrangement does not retard the rate of dissolution of, for example, sugar when the dispenser is used, but has the added advantage that it prevents drips or spillage when the dispenser is laid flat after use. Where the perforations are arranged in lines as just described, the dispenser of the invention lends itself to fabrication by a laser drilling technique. For example, an open ended tube of the desired length and diameter may first of all have one end (the lower end) sealed by a hot clamping technique which also serves to form the flattened portion, after which the tube may be drilled in the desired locations by laser, then filled with the intended material (e.g. sugar or soluble coffee granules) and its other (upper) end sealed. Thus the dispenser can be manufactured by a simple, linear production scheme. If desired, the initial tube may be fabricated at the beginning of the line, e.g. by extruding, drawing or moulding a plastics material.

According to another aspect of the present invention, there is provided a dispensing device for soluble or dispersible materials of the type comprising a tube formed of a liquid-impermeable material and of unitary construction, the tube being closed at both ends and having perforations along a portion of its length at or close to one end, and the tube containing or being adapted to receive a soluble or dispersible material, wherein (a) said tube is divided into two compartments by a temporary seal, said temporary seal being located so that all of said perforations are located in one of said two compartments; and (be when filled, said soluble or dispersible material is contained in the other of said two compartments, i.e. that compartment in which there are no perforations.

The partial seal in this embodiment is of the sort which can be broken by applying finger pressure to the sides of the tube. By locaint the soluble material in a single compartment which is free from perforations, accidental egress of material from the dispensing device is prevented, and similarly accidental contamination of the granular material from external contaminants is prevented.

The soluble or dispersible material may be a pulverulent or granular solid or it may be a liquid; with references to a liquid, the term "soluble" as used herein means capable of solution or dispersion and will generally imply miscibility. The liquid may be an emulsion as is the case, for example, with milk.

The invention is expected to find its main application for use as a sweetening device. When the material within the device is sugar or an artificial sweetener, e.g. saccharin, in finely divided form, a device of this invention when stirred into a cup containing a beverage such as tea or coffee results in rapid dissolution of the sweetener and its dispersion, via the perforations, into the beverage. To aid dispersion that end of the device adjacent to the perforations may be flattened (e.g. during the clamping operation described above) to provide a paddle-like portion.

Preferably, the perforations extend over about 3–8 cm of the length of the device. Conveniently, the device will be 10-20 cm in length, and from 3-15 mm (typically about 8 mm) in diameter.

Where a device in accordance with the present invention has one end formed into a flat paddle, this flat paddle is preferably formed of two laminar elements held together at their tip in a manner such that, when the device is inserted into a hot liquid, the two laminar elements splay out to form a winged-type structure. The splayed ends of the paddle assist in stirring a liquid, e.g. a beverage, into which the material contained in the dispensing device is to be dissolved or dispersed. Furthermore, the splayed ends prevent seepage of material out of the perforations onto a surface, e.g. a table top, on which the device is positioned, thereby assisting in hygienic use of the device. Even if the device is just dipped into a hot drink so that the soluble material has insufficient time to dissolve and disperse, and the device is then placed on a table top, the splayed ends will encourage undissolved material to move away from the perforations, thereby minimising soiling of the table top.

In those embodiments having a temporary seal, the compartment of the tube which is free from perforations preferably has its end tapered or flattened so as to make it easier for the device to be held in the hand when it is used.

The compartment containing the soluble or dispersible material, which may be for example a sweetener or powdered milk, or normal (liquid) milk, is preferably arranged so that the compartment is substantially filled by the material which it contains - in other words, the boundaries of said compartment should surround the volume of material contained therein with substantially no free space.

BRIEF DESCRIPTION OF THE DRAWINGS

For a better understanding of the invention, and to show how the same way be carried into effect, reference will now be made, by way of example, to the accompanying drawings, in which.

DETAILED DESCRIPTION

Figures 1, 3:
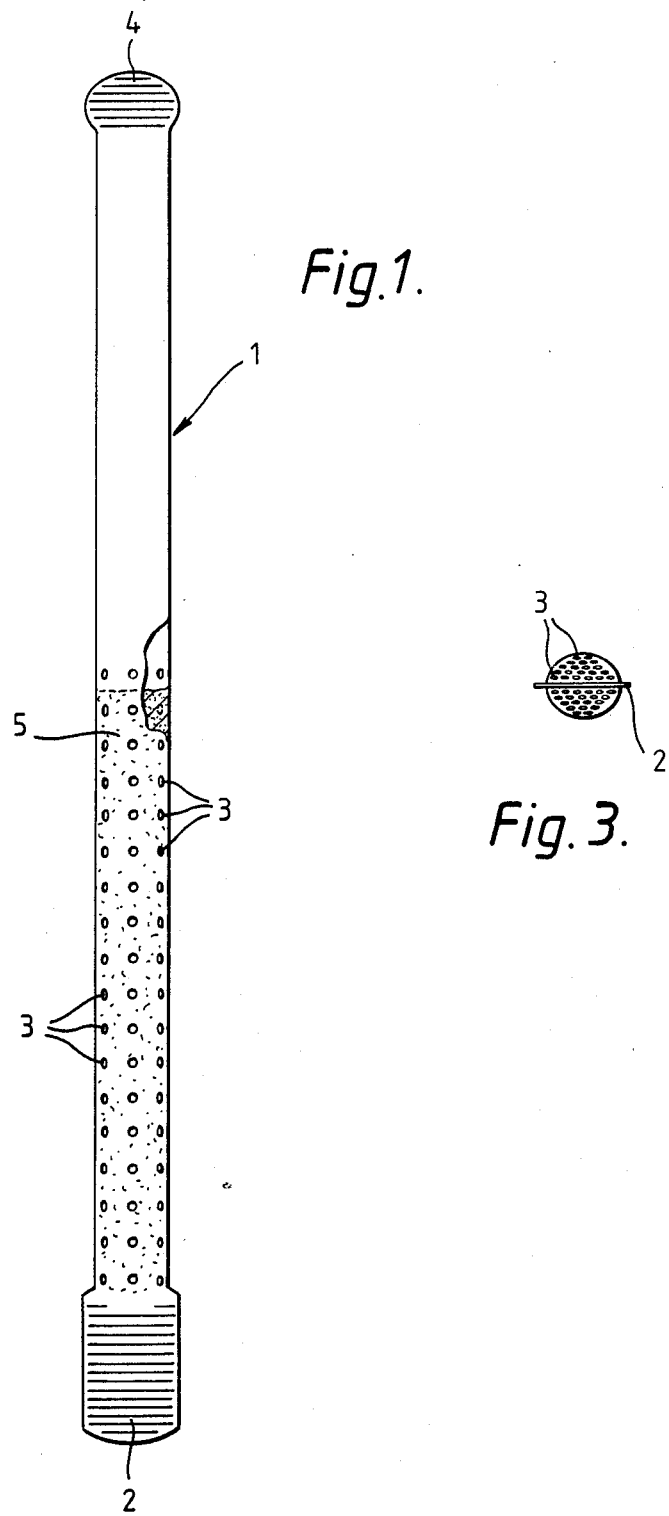
FIG. 1 illustrates a first embodiment of the invention.
FIG. 3 is an end elevation of the article shown in FIG. 2.

Referring first to FIG. 1, the dispenser in accordance with the invention comprises a plastics straw 1 sealed at its bottom end 2 by a hot clamping device and having, adjacent to the sealed end 2, a series of perforations 3. These extend approximately half way along the length of the straw. As will be apparent, the end 2 of the device is flattened and constitutes a paddle which assists in stirring the beverage with which the device is used. The upper end 4 of the straw is also heat-sealed. A fine granular material 5, e.g. sugar or saccharin, is encapsulated within the straw.

Figure 2:
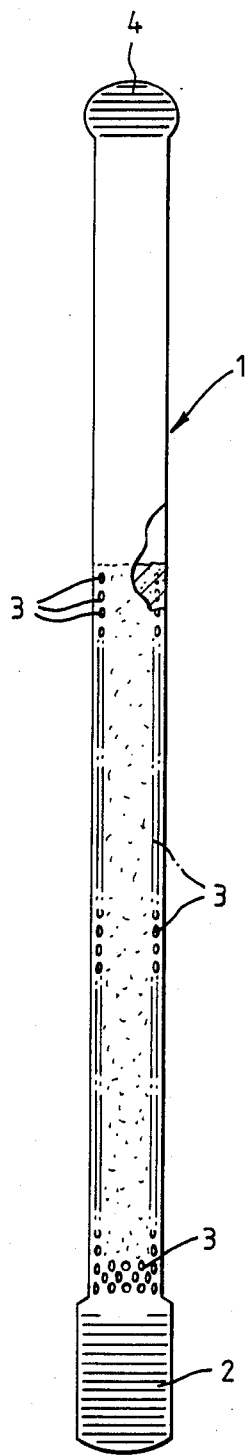
FIG. 2 shows a second embodiment of the invention.
Figure 4:
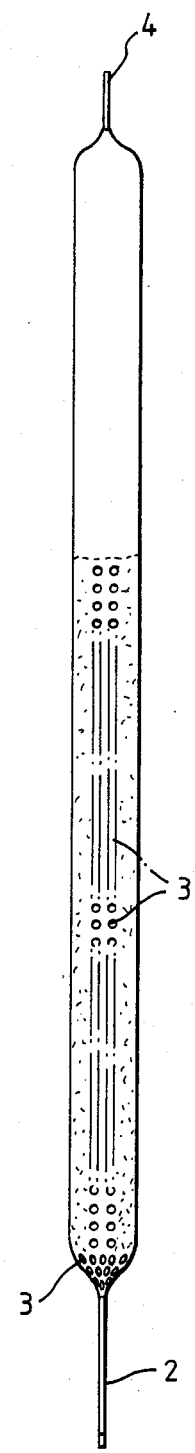
FIG. 4 is a view of the article of FIG. 2 rotated about its longitidinal axis through 90°.

The embodiment of FIGS. 2, 3 and 4 is similar to that of FIG. 1 except in the location of the perforations; the same reference numerals are used to denote the same features throughout. In the embodiment of FIG. 2, the perforations 3 are located only along oposite sides of the tube 1 and are aligned with the edges of the flattened paddle 2, with additional holes 3 immediately adjacent to end 2 (see FIGS. 3 and 4). As described earlier, this arrangement is preferred because it is more hygienic in that because of capillary action drops of liquid do not spill out when the dispenser is laid onto a surface after use.

In use, the device is held close to its upper end 4 and in inserted into a beverage in the manner of a spoon. By producing a stirring action, the granular material 5 within the device rapidly dissolves as a result of contact through perforations 3, and is dispersed into the beverage. Because of its light weight and relatively inexpensive nature, the device is intended to be discarded after use.

Figure 5:
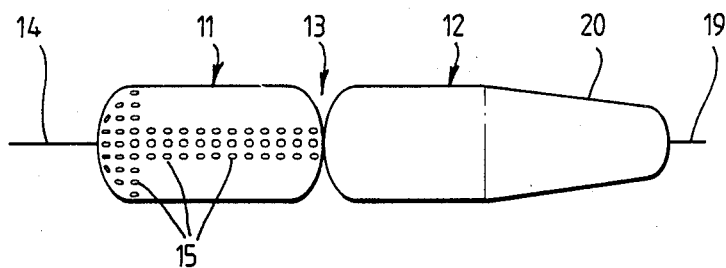
FIG. 5 is a side elevational view of a third embodiment of the invention.
Figure 6:
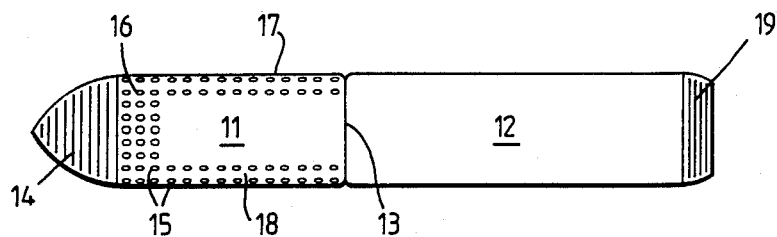
FIG. 6 is a plan view of the device shown in FIG. 5.
Figure 7:
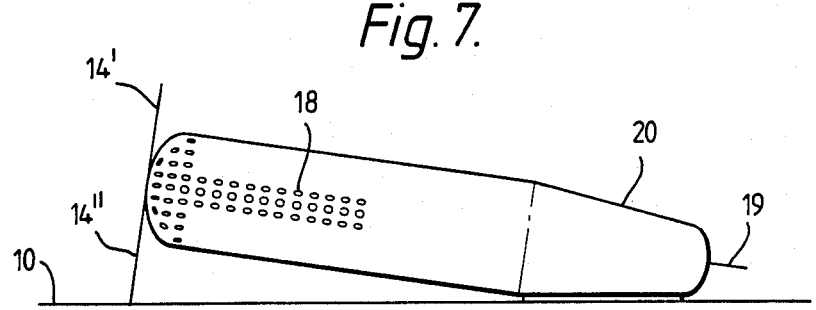
FIG. 7 shows the device of FIGS. 5 and 6 after use and positioned on a table top.

Referring next to FIGs. 5-7 the device comprises a tube which comprises a first compartment 11 and a second compartment 12 joined at 13 by a temporary seal. The walls of the tube are formed of a thermoplastic material, the temporary seal 13 being generated by slight heating of the walls of the initial tube under pressure. A flat, paddle-like portion 14 adjoins the end of the compartment 11 remote from seal 13. Compartment 11 is formed with a plurality of perforations 15, these being located in a region 16 adjacent paddle 14 and in two linear zones 17 and 18 which are aligned in the plane of the paddle 14 as can be seen from the drawings. Compartment 12 is filled with a soluble material (not shown).

The temporary seal 13 is such that it can readily be broken, or "popped", under finger pressure, thereby bringing the two compartments 11 and 12 into communication with one another. Also, the paddle 14 is formed of two laminar segments 14' and 14" (see FIG. 7) which, in their initial condition as shown in FIGS. 5 and 6, are held together.

That end 19 of the device remote from paddle 14 is a flattened, heat-sealed segment. That part 20 of compartment 12 adjacent to segment 19 is tapered, as best seen in FIGS. 5 and 7; this assists in providing a region where the device can, in use, be gripped. It also assists in locating the device in the orientation shown in FIG. 7 after it has been used.

In use, the temporary seal 13 is first of all broken using finger pressure, thereby allowing the soluble material (e.g. milk or a sweetener) to reach the compartment 11. When the device is inserted into a hot beverage, liquid perfuses into the device through the perforations 15, thereby dissolving and/or dispersing the soluble material which then passes out of the perforations into the beverage. Contact with the hot liquid causes the two segments 14' and 14" which together make up paddle 14 to splay out, as seen in FIG. 7. This aids in the stirring action which is used to distribute the dissolved material throughout the beverage. Furthermore, the alignment between the paddle 14 and the lines 17 and 18 of perforations means that, after the segments 14' and 14" have separated to give the result shown in FIG. 7, direct contact between the perforations 15 and a table top 10 on which the device is placed after use is prevented. Hence the tendency of droplets of liquid in contact with perforations 15 after use of the device to soil surface 10 is eliminated or at least significantly ameliorated. Also, any undissolved or undispersed material will tend to move away from the perforations, thereby minimising soiling.

We claim:

1. A dispensing device for a soluble for dispersible material, which device comprises a tube formed of a liquid-impermeable material and of unitary construction, the tube being closed at both ends and having perforations along a portion of it length at or close to one end, and containing a soluble or dispersible material, said dispensing device being entirely formed from a flexible cylindrical plastic tube of continuous unitary thin walled construction as found in a straw.

2. A device as claimed in claim 1, wherein the perforations are present over about one half of the length of the device.

3. A device as claimed in claim 1, wherein the device is from 10–20 cm long and from 0.3 to 0.8 cm in diameter.

4. A device as claimed in claim 1, wherein the perforations in the device are formed by laser drilling.

5. A device as claimed in claim 1, wherein the material is water-soluble.

6. A device as claimed in claim 1, wherein the tube is formed of a synthetic polymeric material.

7. A device as claimed in claim 6, wherein the tube is fabricated entirely from a plastics drinking straw.

8. A device as claimed in claim 1, wherein that end of the device adjacent the perforations is flattened to provide a paddle-like portion.

9. A device as claimed in claim 8, wherein the perforations are present in the region immediately adjacent said paddle-like portion and also in two linear zones extending on opposite sides of the tube and aligned with the edges of said paddle-like portion.

10. A dispensing device for a soluble granular material, which device comprises a tube formed of a water-impermeable synthetic polymeric material and of unitary construction, the tube being closed at both ends with one end thereof being flattened into a paddle-like portion, and having adjacent to said paddle-like portion and extending over a portion of the length of the tube in a direction away from said paddle-like portion a plurality of perforations, the tube containing a water-soluble material;
   said dispensing device including said paddle-like portion being entirely formed from a flexible cylindrical plastic tube of continuous unitary thin walled construction as found in a drinking straw;
   the paddle-like portion and the sealed end including only material formed from the cylindrical plastic tube.

11. A device as claimed in claim 10, wherein the perforations are present in the region immediately adjacent said paddle-like portion and also in two linear zones extending on opposite sides of the tube and aligned with the edges of said paddle-like portion.

12. A device as claimed in claim 11, wherein the perforations in the device are formed by laser drilling.

13. A dispensing device for soluble or dispersible materials of the type comprising a tube formed of a liquid-impermeable material and of unitary construction, the tube being closed at both ends and having perforations along a portion of its length at or close to one end, and the tube containing a soluble or dispersible material, wherein (a) said tube is divided into two compartments by a temporary seal, said temporary seal being located so that all of said perforations are located in one of said two compartments; and (b) when filled, said soluble or dispersible material is contained in the other of said two compartments, i.e., that compartment in which there are no perforations; said dispensing device being entirely formed from a flexible cylindrical tube of continuous unitary thin walled construction as found in a straw.

14. A dispensing device for a soluble granular material comprising:
   an elongated cylindrical plastic tube of continuous unitary thin walled plastic construction as found in a straw;
   said tube having a diameter of between 0.3 and 1.5 centimeters and said tube having a length of between 10 and 20 centimeters;
   said tube having first and second ends, said first end being heat sealed and formed into flat paddle means for stirring a liquid, and said second end being sealed;
   particular material within said tube;
   said tube having perforations through the side wall thereof to permit fluid engagement with said particulate material when immersed in fluid and prevent leakage of residual fluid from the tube when laid on a horizontal surface after use;
   said dispensing device including said paddle means being entirely formed from a flexible cylindrical plastic tube of continuous unitary thin walled construction as found in a straw; and
   the paddle means and the sealed end including only material formed from the cylindrical plastic tube;
   whereby said dispenser may be immersed in a cup of hot liquid and said particular material dispensed into said hot liquid, with said paddle means serving to stir said liquid.

15. A dispensing device for a soluble granular material comprising:
   an elongaged cylindrical plastic tube of continuous unitary thin walled plastic construction as found in a straw;
   said tube having a diameter of between 0.3 and 1.5 centimeters;
   said tube having first and second ends, said first end being heat sealed and formed into a flat paddle, said paddle having a transverse extent greater than the diameter of said tube and constituting means for stirring a liquid and said second end being sealed;
   soluble particulate material within said tube;
   said tube having perforations through the wall thereof adjacent said first end to permit fluid engagement with said particulate material; and
   said dispensing device including said paddle being entirely formed from a flexible cylindrical plastic tube of continuous unitary thin walled construction as found in a straw;
   whereby said dispenser may be immersed in a cup of hot liquid and said particulate material dispensed into said hot liquid, with said paddle serving to stir said liquid.

* * * * *